(12) United States Patent
Warchola (10) Patent No.: US 8,827,002 B2
(45) Date of Patent: Sep. 9, 2014

(54) MANUAL LIFT MECHANISM FOR SNOWPLOW BLADE

(75) Inventor: Marty Warchola, Medina, OH (US)

(73) Assignee: Meyer Products, LLC, Cleveland, OH (US)

( * ) Notice: Subject to any disclaimer, the term of this patent is extended or adjusted under 35 U.S.C. 154(b) by 312 days.

(21) Appl. No.: 13/363,721

(22) Filed: Feb. 1, 2012

(65) Prior Publication Data

US 2013/0042506 A1 Feb. 21, 2013

Related U.S. Application Data (60) Provisional application No. 61/525,357, filed on Aug. 19, 2011.

(51) Int. Cl.
*E02F 3/76* (2006.01)
*E01H 5/06* (2006.01)
*B60R 19/54* (2006.01)

(52) U.S. Cl.
CPC . *E01H 5/06* (2013.01); *B60R 19/54* (2013.01)
USPC ........................................... 172/811; 37/219

(58) Field of Classification Search
USPC ........... 37/231, 232, 235, 264, 266, 270, 271, 37/241, 219; 172/810, 811, 828, 245, 246, 172/247, 250, 817, 776
See application file for complete search history.

(56) References Cited

U.S. PATENT DOCUMENTS

| | | | |
|---|---|---|---|
| 1,328,157 A | 1/1920 | Korhonen | |
| 1,378,502 A | 5/1921 | Ward | |
| 1,383,409 A | 7/1921 | Liddell | |
| 2,063,537 A | 12/1936 | Beard | |
| 2,455,692 A | 12/1948 | McDunnah | |
| 4,456,227 A | 6/1984 | Notenboom | |
| 1,458,881 A | 7/1984 | Jones et al. | |
| 5,088,215 A | 2/1992 | Ciula | |
| 5,615,745 A | 4/1997 | Cross | |
| 5,967,241 A | 10/1999 | Cross et al. | |
| 6,269,557 B1 * | 8/2001 | Henks | 37/235 |
| 6,502,334 B1 * | 1/2003 | Davies | 37/231 |
| 6,726,182 B2 | 4/2004 | Topping, Jr. et al. | |
| 7,419,011 B2 | 9/2008 | Curtis et al. | |
| 7,426,795 B2 * | 9/2008 | Raddon | 37/241 |
| 2007/0084089 A1 | 4/2007 | Shoemaker | |
| 2009/0105911 A1 | 4/2009 | Okeson et al. | |

* cited by examiner

*Primary Examiner* — Robert Pezzuto
(74) *Attorney, Agent, or Firm* — Roger D. Emerson; Timothy D. Bennett; Emerson Thomson Bennett (57) ABSTRACT

A non-powered lift mechanism may be used with a vehicle, such as an ATV, having a support rack and a snowplow assembly including a blade that plows snow. The lift mechanism may include a frame that is mounted to the support rack; an input shaft pivotally mounted to the frame; a handle that is operatively attached to the input shaft; and, a cable having one end connected to the input shaft and a second end connected to the blade. The handle may be manually adjusted by the operator to pivot the input shaft to cause the cable to adjust the blade between: an operational/lowered position; and, a non-operational/raised position.

20 Claims, 13 Drawing Sheets

MANUAL LIFT MECHANISM FOR SNOWPLOW BLADE

This application claims priority to U.S. Ser. No. 61/525,357, filed Aug. 19, 2011, entitled MANUAL LIFT MECHANISM FOR SNOWPLOW BLADE, which is incorporated herein by reference.

BACKGROUND OF THE INVENTION

A. Field of Invention

This invention pertains to the art of methods and apparatuses for snowplow assemblies and more specifically to methods and apparatuses for a manually operated (non-powered) lift mechanism used to lift (raise) and lower a snowplow blade.

B. Description of the Related Art

It is well known to provide snowplow assemblies for use in moving snow and ice from roads, driveways, parking lots and other such surfaces. Typically, the snowplow assembly is suitable to be attached to a particular vehicle, such as a pickup truck or an All Terrain Vehicle (ATV). When the vehicle is moved, the snowplow blade contacts and plows the snow.

It is also known to provide powered lift mechanisms to lift (raise) and lower the snowplow blade. Currently the most common powered lift mechanisms are hydraulic lift mechanisms that use hydraulic pressure to lift (raise) and lower the snowplow blade. Other known types of powered lift mechanisms include electric motor powered lift mechanisms, such as winches. While many known powered lift mechanisms work well for their intended purposes, they have the disadvantage of being relatively heavy and relatively expensive. They also generally provide more lifting capacity than is required for smaller snowplow blades—such as the snowplow blades typically used on ATVs.

It is also know to provide non-powered lift mechanisms that use various mechanical linkages. While many of these non-powered lift mechanisms work well for their intended purposes, they have the disadvantage of being difficult to attach to the corresponding vehicle.

What is needed, then, is a non-powered lift mechanism that is easy to attach to a vehicle and easy to detach from the vehicle yet is also easy to use in raising and lowering a snowplow blade mounted to the vehicle.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
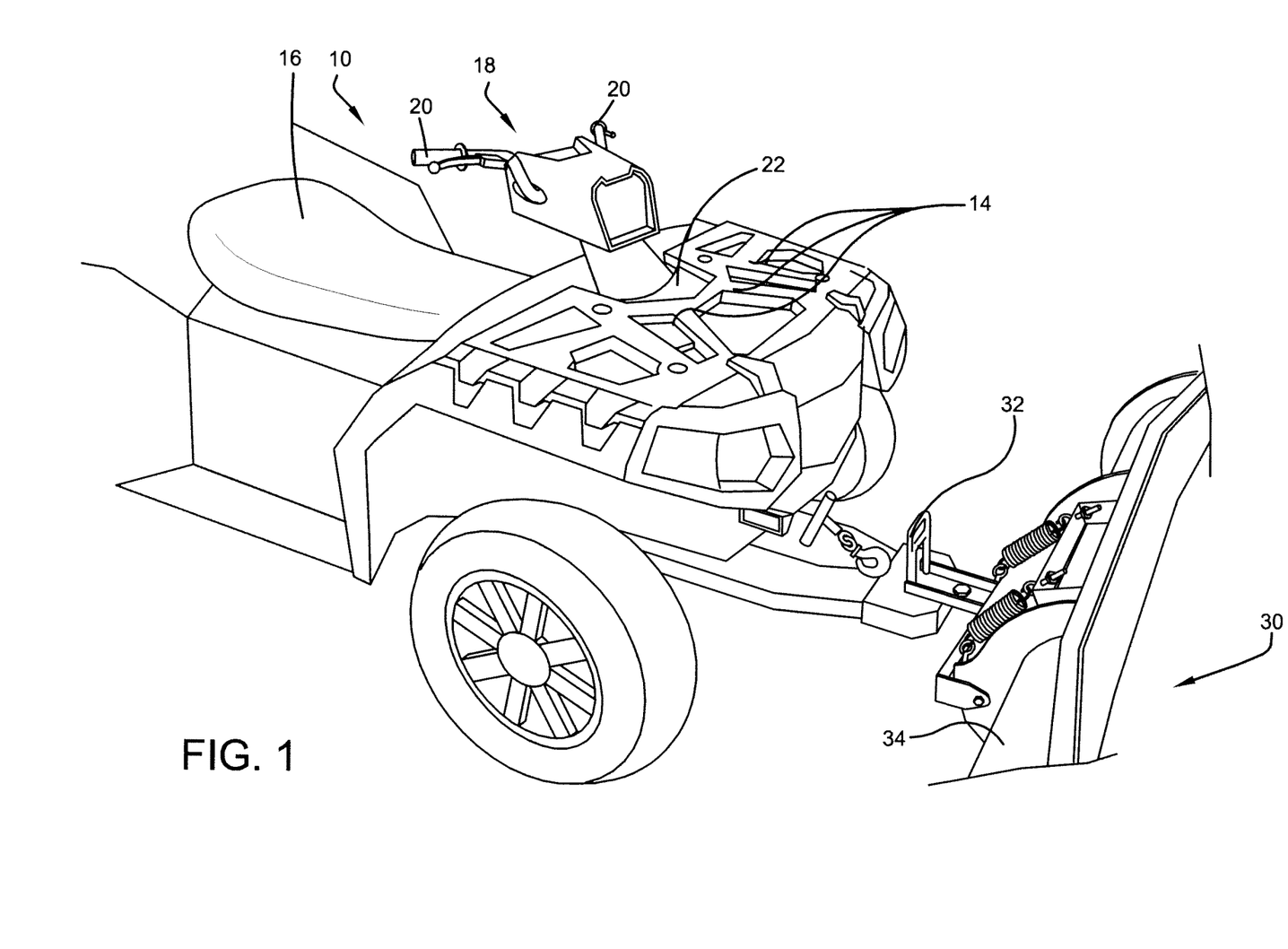
FIG. 1 is a perspective view of a vehicle equipped with a snowplow assembly.
Figure 2:
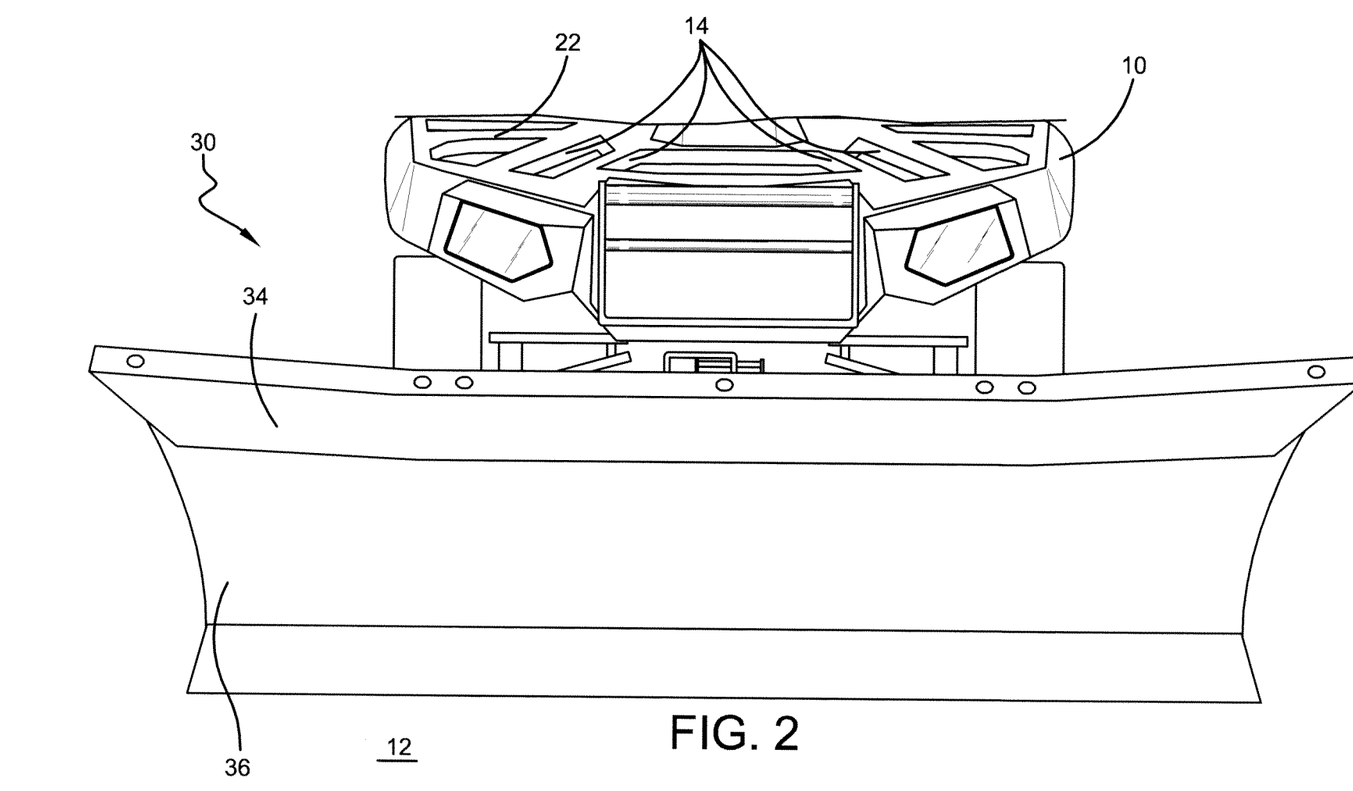
FIG. 2 is a front perspective view of the vehicle and snowplow assembly shown in FIG. 1.
Figure 3:
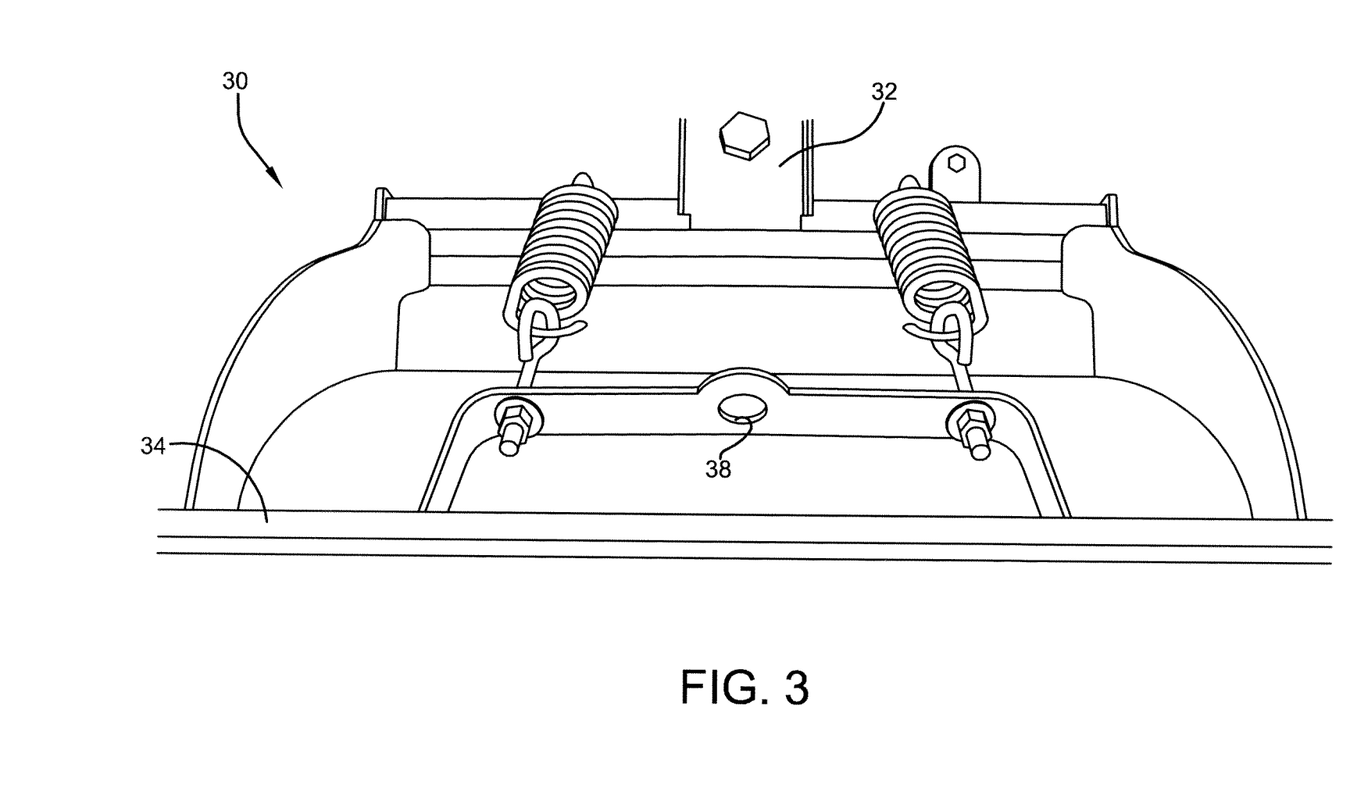
FIG. 3 is a top close-up view of the snowplow assembly shown in FIG. 1.
Figure 4:
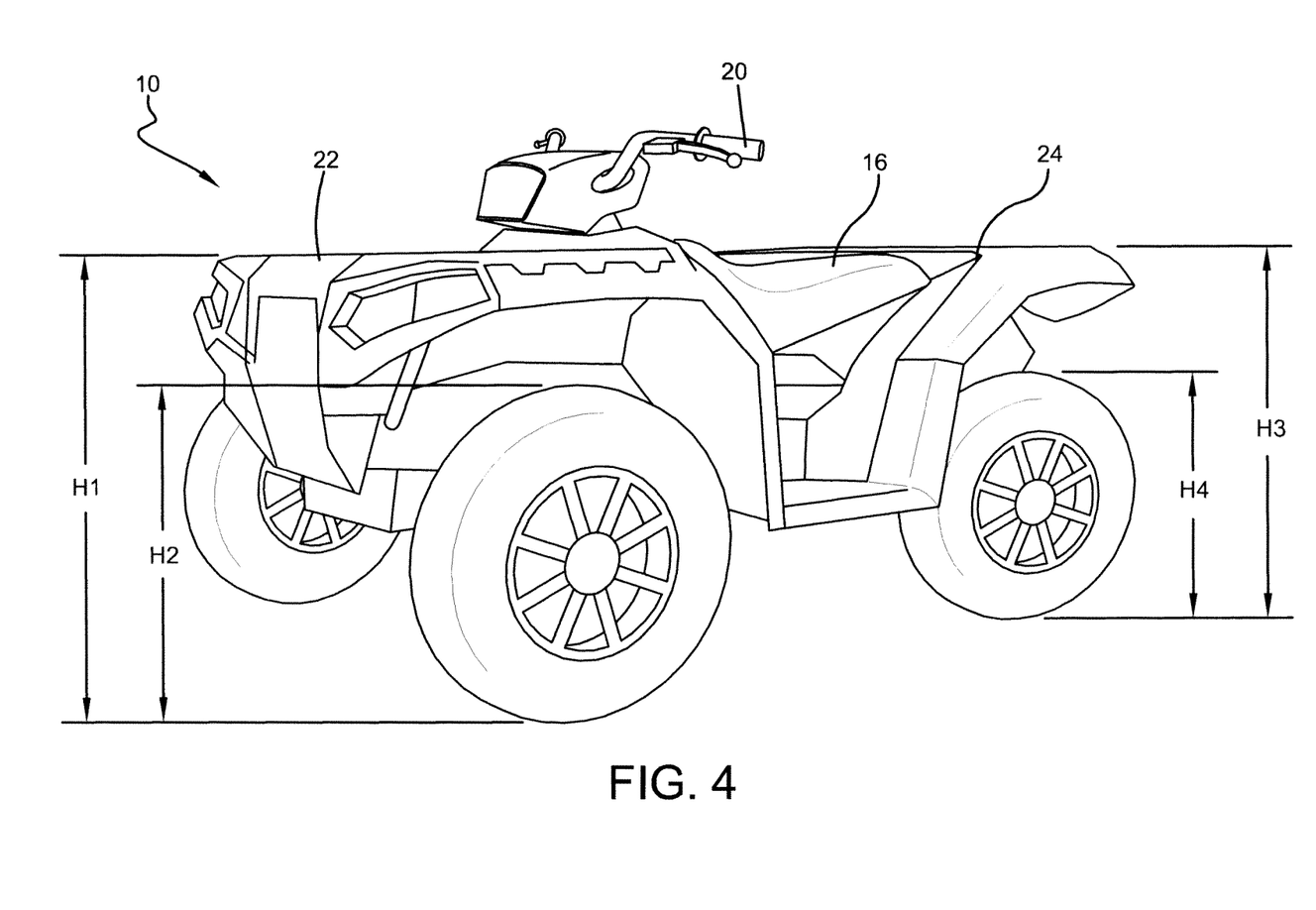
FIG. 4 is a side view of a vehicle similar to that shown in FIG. 1.
Figure 5:
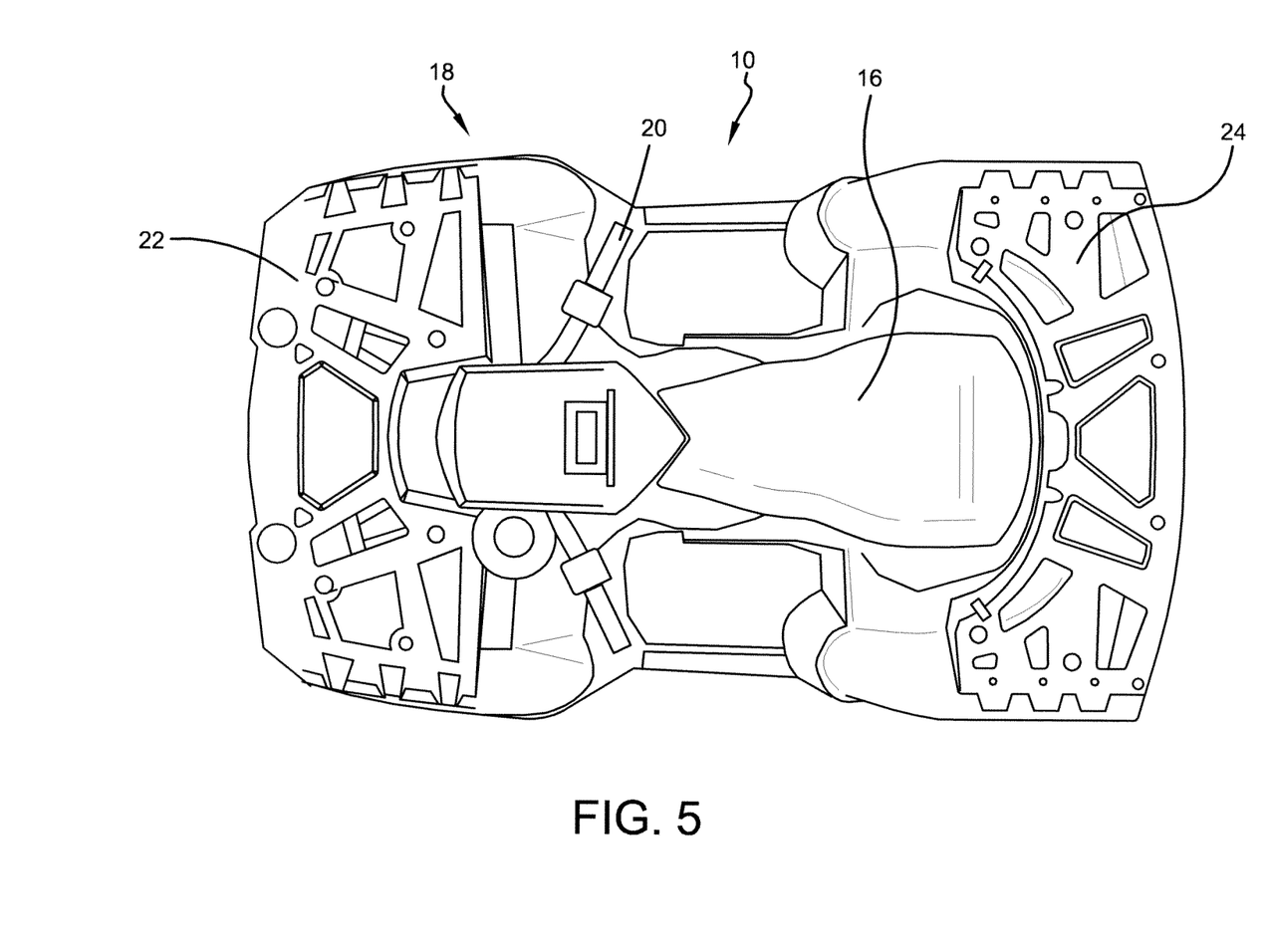
FIG. 5 is a top view of a vehicle similar to that shown in FIG. 1.

Referring now to the drawings wherein the showings are for purposes of illustrating embodiments of the invention only and not for purposes of limiting the same, and wherein like reference numerals are understood to refer to like components, FIGS. 1-3 show a vehicle 10 equipped with a snowplow assembly 30 that may use a non-powered lift mechanism 50, shown in FIGS. 7-12, according to one embodiment of this invention. While the non-powered lift mechanism 50 of this invention is ideally suited for application with an All-Terrain Vehicle (ATV), it should be understood that the non-powered lift mechanism 50 of this invention will work well with any vehicle chosen with the sound judgment of a person of skill in the art. By "ATV" it is meant a vehicle that includes: (1) at least one front ground engaging wheel; (2) at least one back ground engaging wheel; (3) at least three ground engaging wheels total; (4) where the wheelbase (the distance between the centers of the front and rear wheels) and/or the track (the distance between the centerline of two outer side wheels that are axially aligned) is smaller than the typical automobile; (5) at least one of an engine and a motor that provides locomotion for the ATV; (6) a steering device, such as having a contact surface used by an associated operator to steer the ATV; and, (7) at least one operator seat. Some non-limiting examples of ATVs include golf carts and riding lawn mowers. One example of an ATV 10 is shown in FIGS. 1 and 4-5 which shows an operator seat 16 of the straddle type and a steering device 18 comprising handle bars having contact surfaces 20, 20 that are used, as is well known, to steer the ATV 10. Another example of an ATV 10 is shown in FIG. 6 which shows an operator seat 16 of the "legs forward" type and a steering device 18 comprising a steering wheel having a contact surface 20 that is used, as is well known, to steer the ATV 10.

Figure 6:
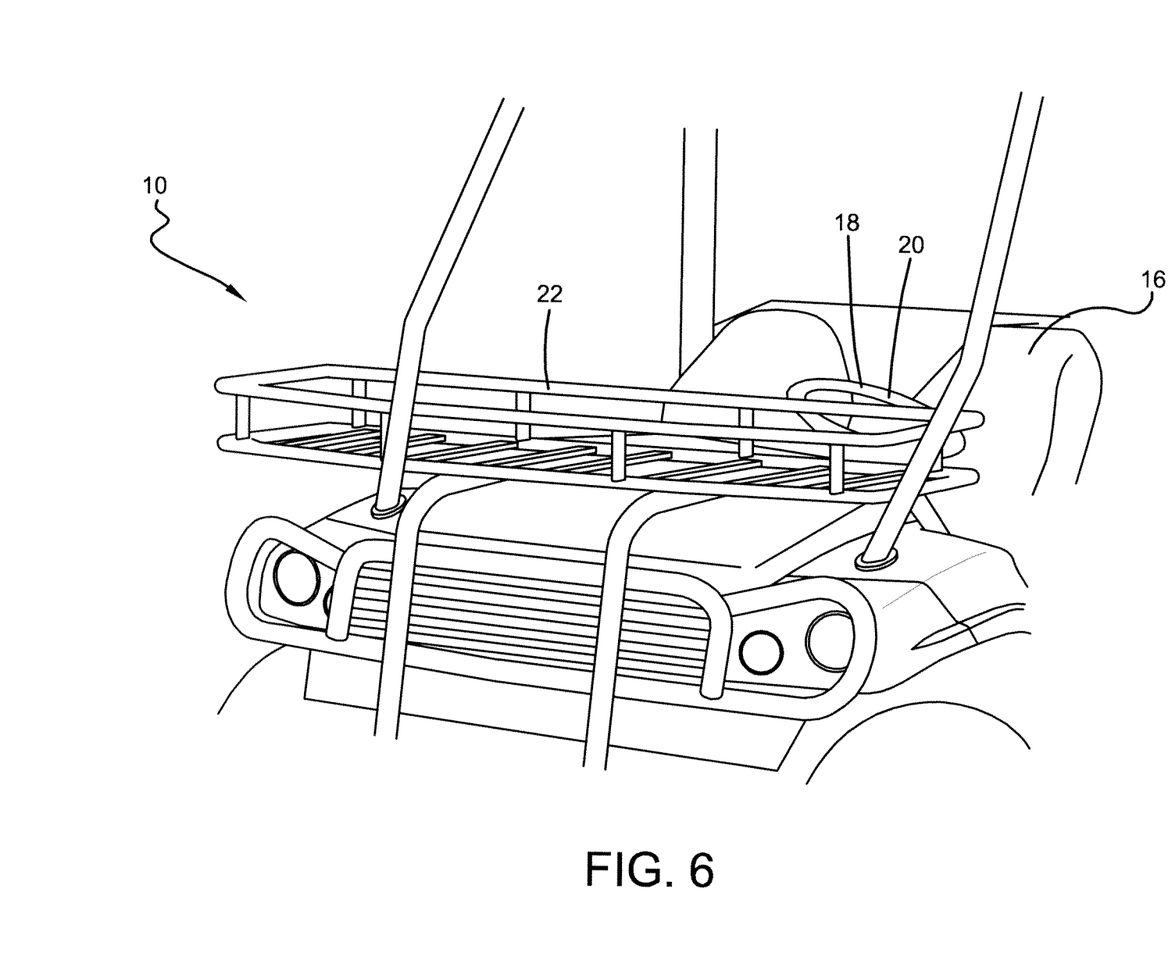
FIG. 6 is a perspective front view of another vehicle.
Figure 7:
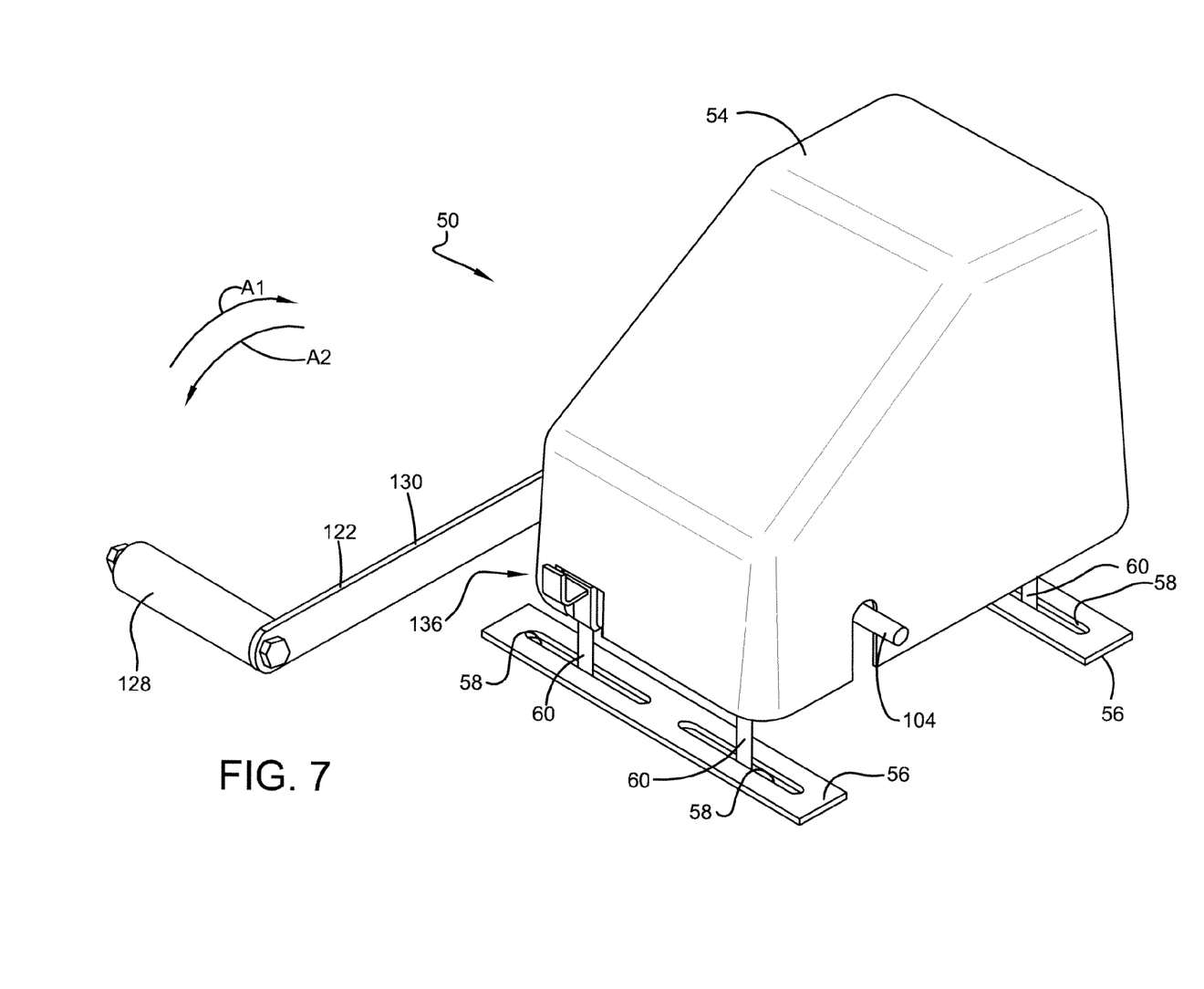
FIG. 7 is a perspective side view of a non-powered lift mechanism.

With reference now to FIGS. 1-2 and 4-6, the vehicle 10 may have a front support rack 22 positioned in front of the contact surface 20 of the steering device 18 and/or a back support rack 24 positioned in back of the operator seat 16. The support rack 22, 24 can be of any design and size suitable to support the non-powered lift mechanism 50. Non-limiting examples are shown in FIGS. 4-5 and FIG. 6. For the embodiment shown in the FIGURES (see especially FIG. 4), the front support rack 22 is positioned at a height H1 that is above the front wheel/tire height H2. Similarly, the back support rack 24 is positioned at a height H3 that is above the back wheel/tire height H4. These positions for the support racks 22, 24 improve the ease of installation and the ease of use of the non-powered lift mechanism 50.

With reference now to FIGS. 1-3, while the snowplow assembly 30 shown is of a specific type and shape, it should be understood that the non-powered lift mechanism 50 of this invention will work well with any snowplow assembly chosen with the sound judgment of a person of skill in the art. The snowplow assembly 30 may include a snowplow support frame 32 that is attachable to the vehicle 10 and that supports a blade 34. The blade 34 has a plow surface 36 (shown in FIG. 2) that is suitable to contact and plow snow, ice or the like as is well known to those of skill in the art. The support frame 32 may be of any design chosen with the sound judgment of a person of skill in the art that permits the blade 34 to be lowered with respect to the vehicle 10 into an operational position where snow can be plowed from a ground surface 12 and to be lifted (raised) with respect to the vehicle 10 into a non-operational position where the blade 34 is positioned above the ground surface 12. As these positions are well known to those of skill in the art, further details will not be provided here.

With reference now to FIGS. 1-2 and 4-12, embodiments of the non-powered lift mechanism 50 will now be described. It should be noted that by "non-powered" it is meant that no power source (such as a hydraulic or pneumatic lift cylinder, or an electric motor driven winch) is used to aid the operator in lifting the blade. The non-powered lift mechanism 50 may have a frame 52 that supports various components yet to be described and a cover 54 that fits over the frame 52 to protect the components. To support the frame 52 to the vehicle 10, at least one foot 56 (two shown) may extend from a base plate 64 of the frame 52 and be positioned in slots 14 located on one of the support racks 22, 24 (the front support rack 22 shown) on the vehicle 10. The feet 56 may have grooves 58 that receive threaded bolts 60 that extend through openings 62 formed in the frame 52 as shown. Each bolt 60 may have a matching nut 63 that can be tightened to secure the non-powered lift mechanism 50 to the vehicle 10. The grooves 58 and openings 62 may be shaped, as shown, to provide flexibility in attaching the non-powered lift mechanism 50 to the front or back support rack 22, 24 though they also provide ease in attaching to other surfaces of a vehicle 10. The feet 56 also make it very easy to detach the non-powered lift mechanism 50 from the vehicle 10 such as when it is desirable to use the vehicle 10 for non-snow plowing purposes. The frame 52 may also have a pair of side plates 66, 66 and an end plate 68 that extend upward from the base plate 64. Screws 70 may be used to hold the cover 54 to the frame 52, as shown.

With reference now to FIGS. 3 and 7-12, the non-powered lift mechanism 50 may have first and second links 72, 74. The first link 72 may have a first end 76 that is pivotally attached to the frame 52 in any manner chosen with the sound judgment of a person of skill in the art. For the embodiment shown, the first end 76 has an opening that receives pivot shaft 78 that is attached to the base plate 64. The pivot shaft 78 may be supported to the base plate 64 with a pair of support tabs 80, 80. In one embodiment, the first link 72 is fixed to the pivot shaft 78 and the pivot shaft 78 is pivotal with respect to the support tabs 80, 80. In another embodiment, the pivot shaft 78 is fixed with respect to the support tabs 80, 80 and the first link 72 is pivotal about the pivot shaft 78. In yet another embodiment, the first link 72 is pivotal about the pivot shaft 78 and the pivot shaft 78 is pivotal with respect to the support tabs 80, 80. The first link 72 may also have a second end 82 having a cable connecting device 84 that is suitable to connect to a cable 86. By "cable" it is meant any device that is suitable to bear a load in tension but not in compression. Some non-limiting examples of a cable include a chain and a rope. The cable 86 may extend from the first link 72, through an opening 88 in the end plate 68, at least partially around a roller 90 supported to the end plate 68, and down to the blade 34. The blade 34 may have a cable attachment surface 38 (FIG. 3), such as an opening, to which the cable 86 can be attached. The roller 90 may be rotatable about a rotation pin 92 that is supported to the end plate 68 with support tabs 94 and bolt/nut assemblies 96, as shown.

Figure 10:
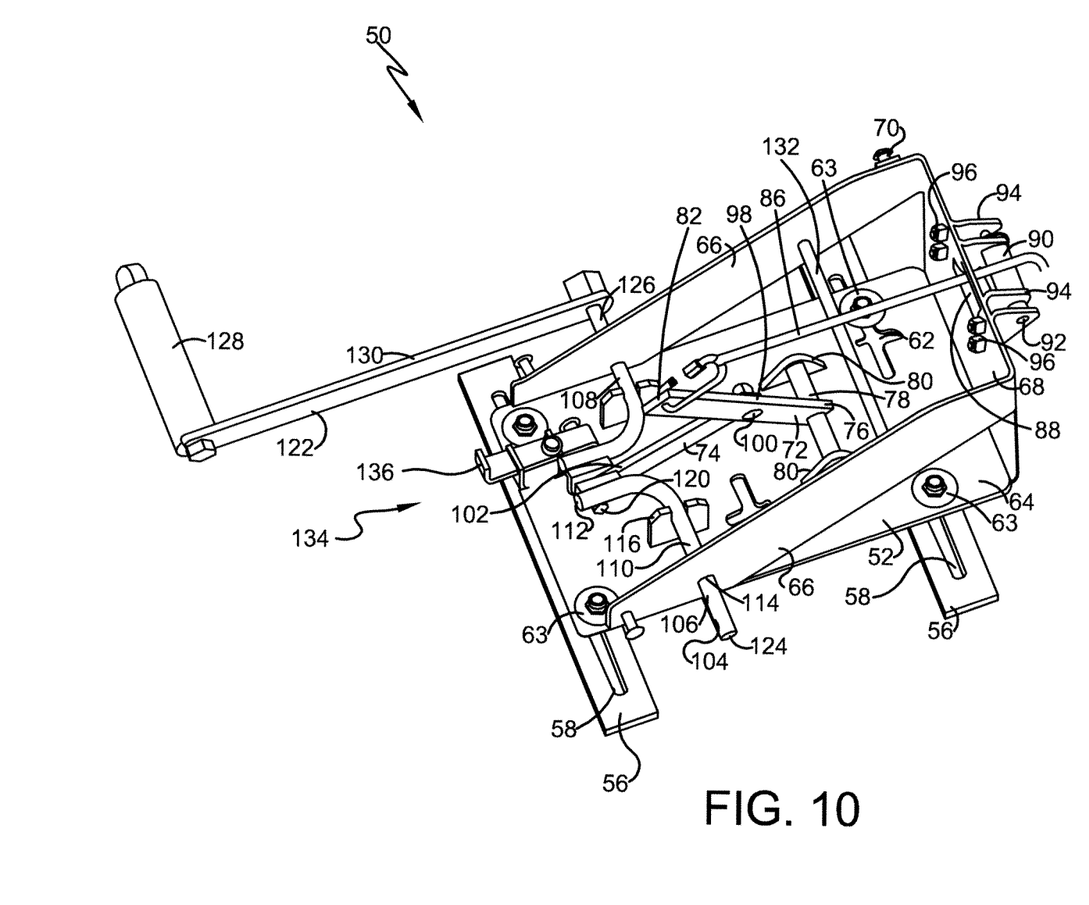
FIG. 10 is a top perspective view of the non-powered lift mechanism with the cover removed.
Figure 11:
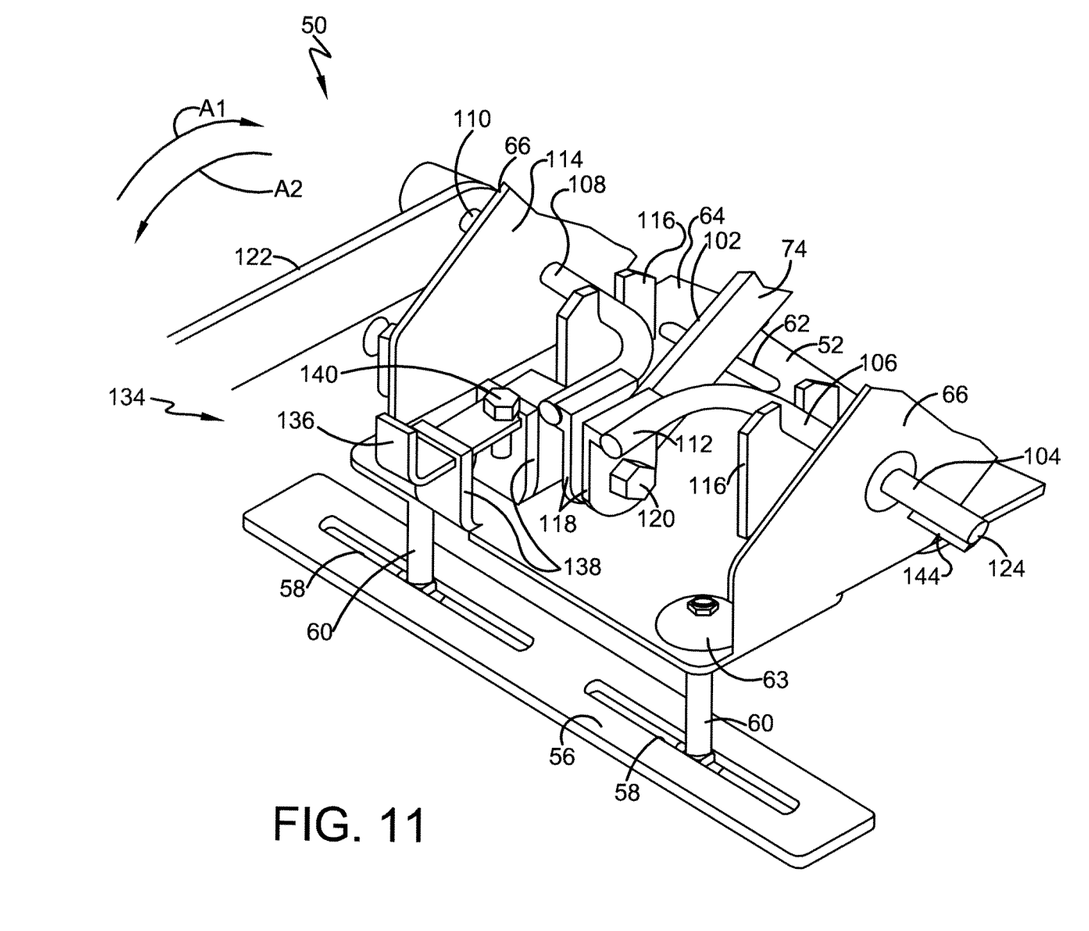
FIG. 11 is a close-up perspective view of the non-powered lift mechanism shown in FIG. 10.
Figure 12:
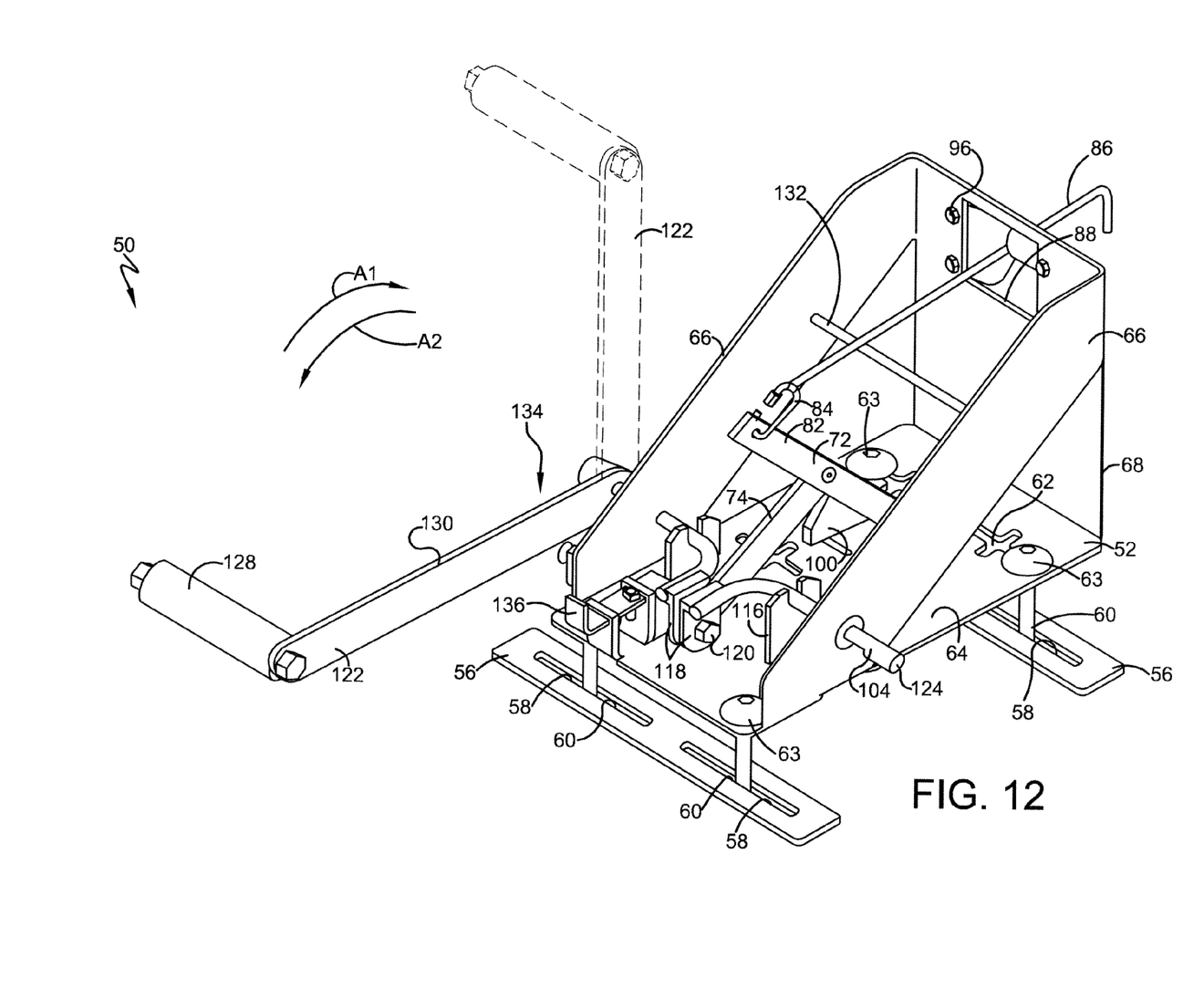
FIG. 12 is a side perspective view of the non-powered lift mechanism shown in FIG. 10.

With reference now to FIGS. 10-12, the second link 74 may have a first end 98 that is pivotally attached to the first link 72. This pivotal connection may be achieved by inserting a pivot pin 100 through holes in the first and second links 72, 74. The second link 74 may have a second end 102 that is pivotally attached to an input shaft 104 in any manner chosen with the sound judgment of a person of skill in the art. For the embodiment shown, the input shaft 104 comprises first and second shaft members 106, 108. Each shaft member 106, 108 may be generally L-shaped having a main body 110 and a leg 112, as shown. To support the input shaft 104 for rotation with respect to the frame 52, each shaft member 106, 108 may have an outer portion received within an opening 114, which may be journaled as shown, formed in a side plate 66, 66. An inner portion of each shaft member 106, 108 may be received within a slot formed in a support tab 116 that extends upward from the base plate 64, as shown. The legs 112, 112 of each shaft member 106, 108 may be juxtaposed, as shown, to provide a mechanical advantage as understood by those of skill in the art. A support tab 118 may be fixedly attached to an outer surface of each leg 112, 112, as shown. A pivot shaft 120 may be inserted through openings formed in the support tabs 118, 118 and through an opening formed in the second end 102 of the second link 74. In this way rotation of the input shaft 104 will cause the second link 74 to move, as will be described further below.

With reference now to FIGS. 7-12, a handle 122 may be attached to either outer end 124, 126 of the input shaft 104 in any manner chosen with the sound judgment of a person of skill in the art. For the embodiment shown, a woodruff key is used to secure the handle 122 to the outer ends 124, 126. As can be easily understood, the handle 122 can be attached to either outer end 124, 126 as desired by the operator. In this way, the non-powered lift mechanism 50 can easily be adjusted to be either "left handed" or "right handed." While the handle 122 may be of any design chosen with the sound judgment of a person of skill in the art, for the embodiment shown the handle 122 has a main body 130 with a distal end that attaches to the input shaft 104 and a proximal end having a grip portion 128 extending laterally therefrom.

Figure 8:
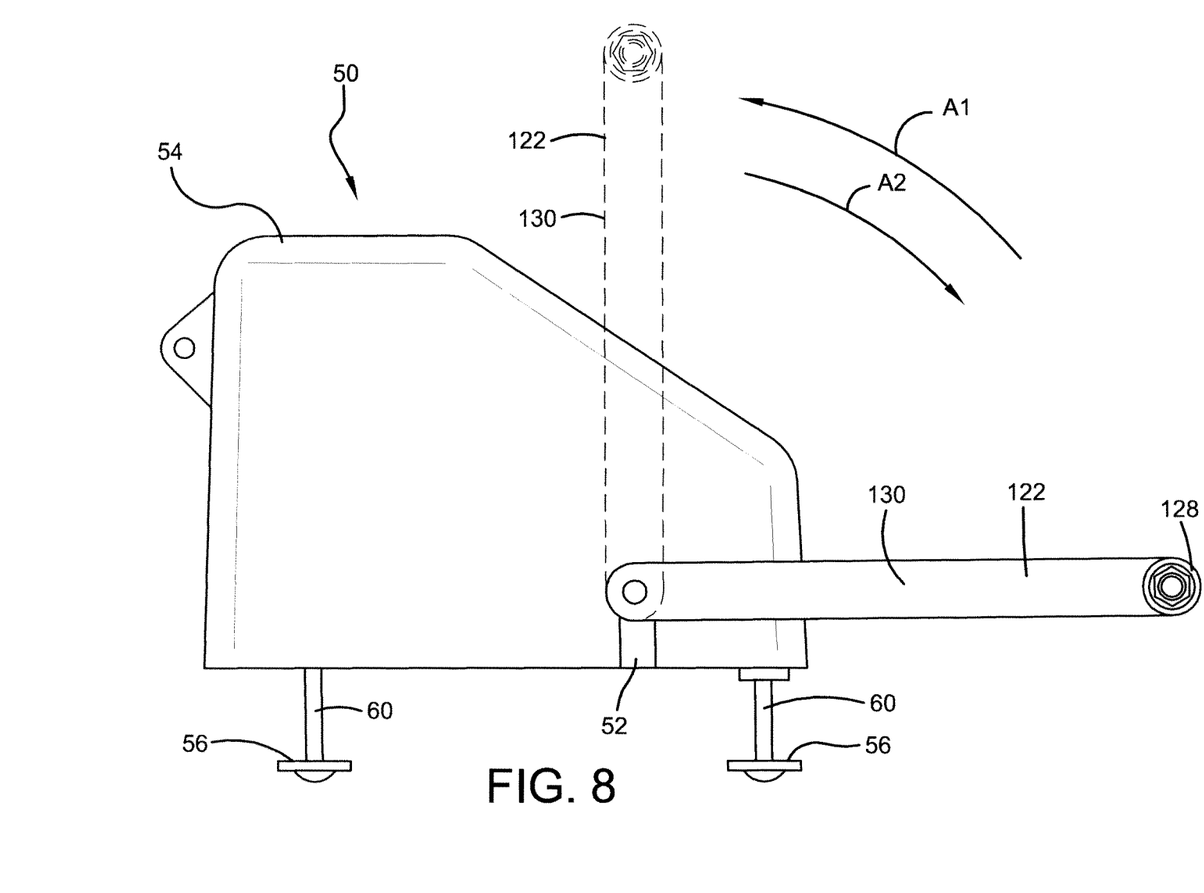
FIG. 8 is a side view of the non-powered lift mechanism shown in FIG. 4.
Figure 9:
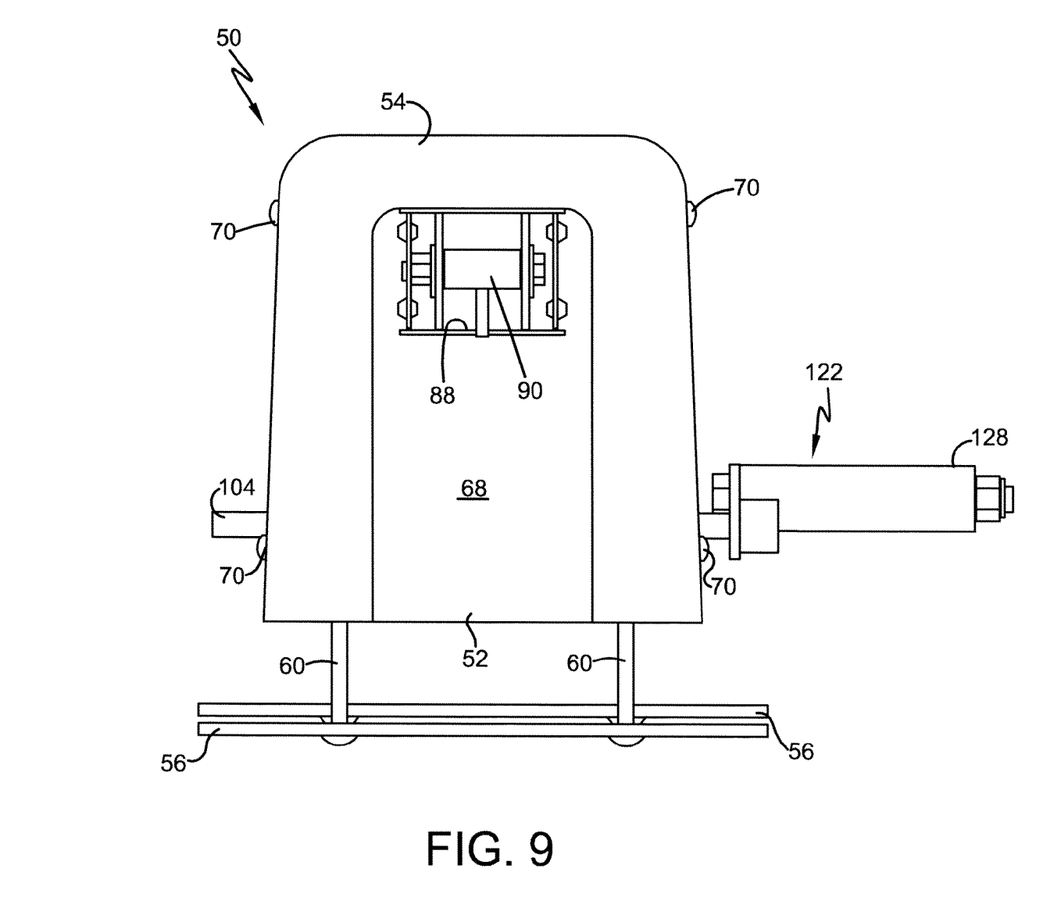
FIG. 9 is an end view of the non-powered lift mechanism shown in FIG. 4.

With reference now to FIGS. 1-12, to operate the non-powered lift mechanism 50 to adjust the blade 34 from the non-operational (raised) position into the operational (lowered) position the operator grasps the handle 122 and adjusts it (rotates or pivots it in the embodiment shown) from the position shown in dark lines in FIGS. 8 and 12, in a first direction A1, to the position shown in dashed lines in FIGS. 8 and 12. This motion of the handle 122 causes the input shaft 104 to also pivot or rotate in first direction A1. This rotation of the input shaft 104 causes the second link 74 to apply a force to the first link 72, causing the first link 72 to pivot in first direction A1 about the pivot shaft 78. This pivoting motion of the first link 72, aided by the weight of the blade 34, causes the cable 86 to move out of the non-powered lift mechanism 50 (via opening 88 in the end plate 68) and permits the blade 34 to lower into the operational position. In order to limit the motion of the first link 72 in first direction A1, a stop bar 132 may be attached to the frame 52. For the embodiment shown, the stop bar 132 may be fixed to the side plates 66, 66 in a predetermined location to limit this motion. Thus, once the first link 72 has pivoted in first direction A1 the predetermined amount, the first link 72 (or alternatively, the first end 98 of the second link 74) contacts the stop bar 132 preventing further motion of the first link 72 in first direction A1. This limit of the pivoting motion of the first link 72 also serves to limit the distance that the grip portion 128 of the handle 122 may move away from operator.

With continuing reference to FIGS. 1-12, to operate the non-powered lift mechanism 50 to adjust the blade 34 from the operational (lowered) position to the non-operational (raised) position, the operator grasps the handle 122 and adjusts/rotates it in second direction A2 which causes the input shaft 104 to also rotate in second direction A2. This rotation of the input shaft 104 causes the second link 74 to apply a force to the first link 72, causing the first link 72 to pivot in second direction A2 about the pivot shaft 78. This pivoting motion of the first link 72 causes the cable 86 to move into the non-powered lift mechanism 50 (via opening 88 in the end plate 68) and lifts or raises the blade 34 into the non-operational position. In order to lock the non-powered lift mechanism 50 in the non-operational position, a locking mechanism 134 may be used. While the locking mechanism 134 can be of any type chosen with the sound judgment of a person of skill in the art, for the embodiment shown, the locking mechanism 134 includes a push bar 136 having a proximal end that extends outside of the cover 54. The push bar 136 may be supported to the frame 52 via a pair of support tabs 138, 138 that extend from the base plate 64 and have openings that receive the push bar 136. A motion limit device 140, such as a bolt as shown, may be attached to the push bar 136 between the support tabs 138, 138 to limit the motion of the push bar 136 into the non-powered lift mechanism 50 (as the motion limit device 140 contacts the inner support tab 138) and to prevent the push bar 136 from being removed from the non-powered lift mechanism 50 (as the motion limit device 140 contacts the outer support tab 138) when the push bar 136 is pulled out of the non-powered lift mechanism 50. Note that the pivot shaft 120 may extend beyond the support tabs 118, 118 and beyond the push bar 136. Thus, when the non-powered lift mechanism 50 is in the non-operational position, the push bar 136 can be pushed into the non-powered lift mechanism 50 and over the pivot shaft 120. In this position, the non-powered lift mechanism 50 is locked as the input shaft 104 cannot be rotated until the push bar 136 is pulled out of interference with the pivot shaft 120.

Figure 13:
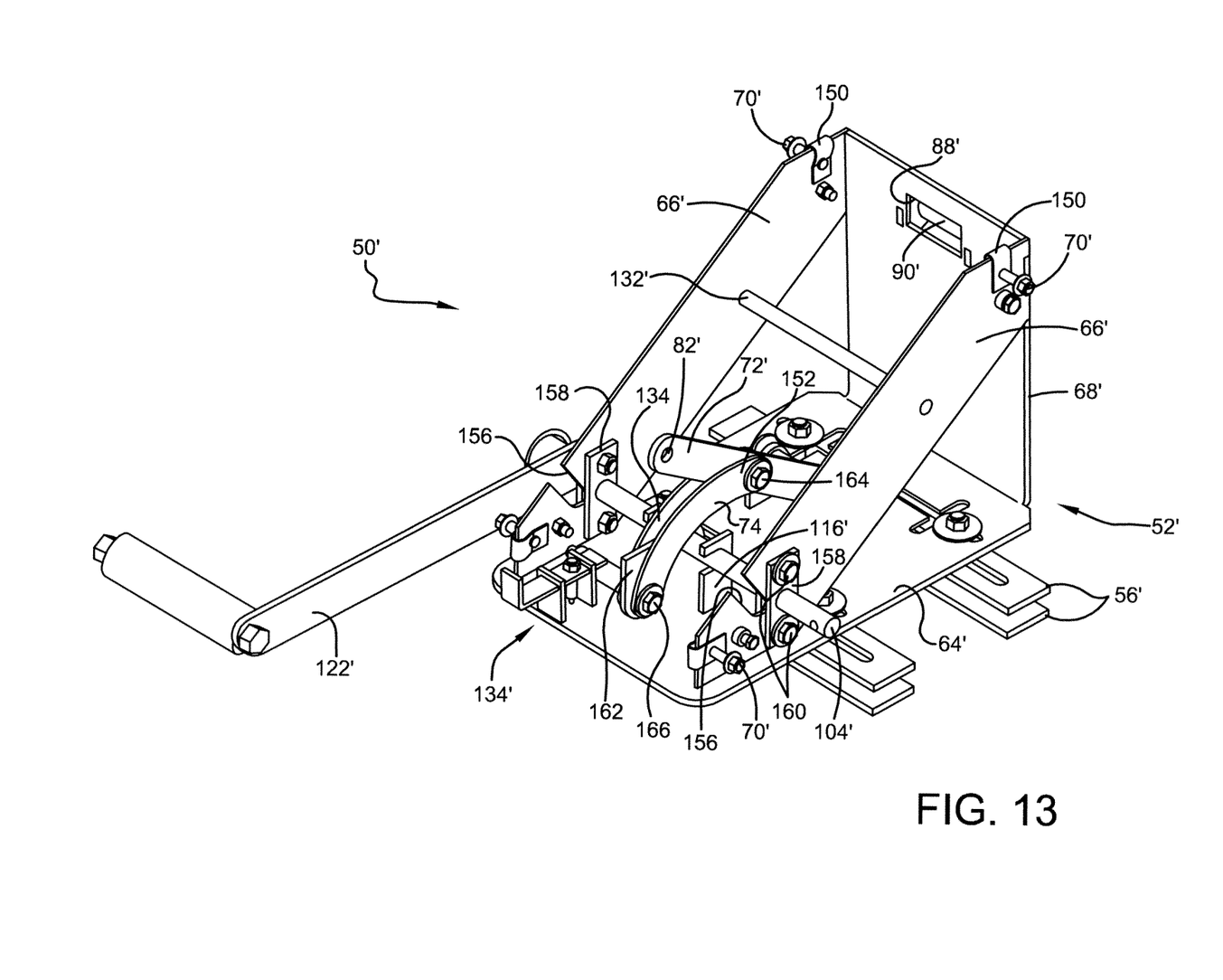
FIG. 13 is a side perspective view of an alternate non-powered lift mechanism with the cover removed.

With reference now to FIG. 13, embodiments of an alternate non-powered lift mechanism 50' will now be described. Because the general operation for the non-powered lift mechanism 50' is similar to the non-powered lift mechanism 50 discussed above, similar components will be given the same reference numbers except with the addition of a symbol. Distinct and/or new components will be given new reference numbers. The non-powered lift mechanism 50' may have a frame 52' and a cover (not shown but similar to cover 54 described above) that fits over the frame 52' to protect the components. To support the frame 52' to a vehicle (such as the vehicle 10 discussed above) feet 56' may be used in a manner similar to feet 56 described above. The frame 52' may have a pair of side plates 66', 66' and an end plate 68' that extend upward from a base plate 64'. Screws 70' may be used to hold the cover to the frame 52'. The screws may be used with clips 150 in a known manner. The non-powered lift mechanism 50' may have first and second links 72', 74'. The first link 72' may be pivotally attached to the frame 52' and may have an end 82' that is suitable to connected to a cable (not shown) in a manner similar to the previously described first link 72. The cable may extend from the first link 72', through an opening 88' in the end plate 68' and at least partially around a roller 90' and down to the blade (not shown).

An input shaft 104' may be a single component that is generally cylindrical in shape, as shown, and have a first end rotatably received in one side plates 66' and a second end rotatably received in the other side plate 66'. The side plates 66', 66' may have cut-outs 156 into which the input shaft 104' can easily be inserted. At least one bearing plate 158 may be attached to each side plate 66' and may have an opening that receives and rotatably supports the input shaft 104'. For the embodiment shown, two bearing plates 158, 158 are used for each end of the input shaft 104' and are positioned on opposite sides of each side plate 66', 66'. The bearing plates 158 may be attached to the side plates 66', 66' in any manner chosen with the sound judgment of a person of skill in the art. For the embodiment shown, a pair of bolts 160 are used to hold each pair of bearing plates 158, 158 to the corresponding side plate 66'. The input shaft 104' may include an extension member 162 having a first end fixedly attached to the input shaft 104' and a second end pivotally attached to the second link 74'. For the embodiment shown, the first end of the extension member 162 has an opening that receives the input shaft 104'. The input shaft 104' may also be received and supported within a slot formed in a support tab 116', two such tabs shown, that extends upward from the base plate 64' between the side plates 66', 66', as shown.

With continued reference to FIG. 13, the second link 74' may comprise first and second link members 152, 154 having first ends pivotally attached to the first link 72' and second ends pivotally attached to the input shaft 104'. While the link members 152, 154 may be of any shape and size chosen with the sound judgment of a person of skill in the art, for the embodiment shown the link members 152, 154 are arcuate. A first pivot shaft 164 may be positioned within openings formed in the first ends of the first and second link members 152, 154 and an opening formed in the first link 72' to create the pivotal attachment of the second link 74' to the first link 72'. A second pivot shaft 166 may be positioned within openings formed in the second ends of the first and second link members 152, 154 and an opening formed in the second end of the extension member 162 to create the pivotal attachment of the second link 74' to the input shaft 104'. Rotation of the input shaft 104' will cause the second link 74' to move. A handle 122' may be attached to either outer end of the input shaft 104' and used to rotate the input shaft 104'.

In order to limit the motion of the first link 72' a stop bar 132' may be attached to the frame 52', such as to the side plates 66', 66', as shown. A locking mechanism 134' may be used and may include a push bar 136' that operates similar to the push bar 136 described above.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A non-powered lift mechanism suitable to be used with an associated ATV having: (1) at least a first front wheel with a front wheel/tire height; (2) at least a first back wheel with a back wheel/tire height; (3) at least one of an engine and a motor that provides locomotion for the ATV; (4) a steering device having a contact surface used by an associated operator to steer the ATV; (5) at least one operator seat; (6) at least one of: (a) a front support rack that is positioned in front of the contact surface of the steering device and above the front wheel/tire height; and, (b) a back support rack that is positioned in back of the operator seat and above the back wheel/tire height; and, (7) a snowplow assembly supported to the ATV and including a blade that: (a) has a plow surface that is suitable to contact and plow snow; and, (b) is adjustable between an operational/lowered position a non-operational/raised position; wherein the non-powered lift mechanism comprises:
- a frame that is mounted to the at least one of the front support rack and the back support rack;
- an input shaft pivotally mounted to the frame;
- a handle that is operatively attached to the input shaft and accessible to be adjusted by the operator while sitting on the vehicle operator seat;
- a cable having a first end operatively connected to the input shaft and a second end operatively connected to the blade;
- a first link and a second link wherein, (1) the first link has a first end that is pivotally attached to the frame and a second end; and, (2) the second link has a first end that is pivotally attached to the first link and a second end that is pivotally attached to the input shaft, wherein the first end of the cable is attached to the second end of the first link; and,
- wherein the handle is manually adjustable by the operator to pivot the input shaft to cause the cable to adjust the blade between: (1) the operational/lowered position; and, (2) the nonoperational/raised position.

2. The non-powered lift mechanism of claim 1 wherein:
the input shaft has first and second ends that are accessible from first and second opposite sides of the non-powered lift mechanism;
the handle is mountable to the first end of the input shaft to create a right handed operation application for the operator; and,
the handle is mountable to the second end of the input shaft to create a left handed operation application for the operator.

3. The non-powered lift mechanism of claim 1 further comprising a locking mechanism that is manually adjustable between: (1) a first condition preventing the input shaft from pivoting; and, (2) a second condition permitting the input shaft to pivot, the locking mechanism comprising:
- a push bar that is manually slideable between: (1) a first position where the push bar physically interferes with the pivoting motion of the input shaft; and, (2) a second position where the push bar does not physically interfere with the pivoting motion of the input shaft; and,
- a motion limit device that: (1) limits the motion of the push bar into the non-powered lift mechanism; and, (2) prevents the push bar from being removed from the non-powered lift mechanism.

4. The non-powered lift mechanism of claim 1 wherein:
the frame comprises: (1) a base plate that is mountable to the vehicle; (2) first and second side plates that extend upward from opposite sides of the base plate; and, (3) an end plate that extends upward from the base plate and that has an opening;
the second end of the cable extends through the opening in the end plate; and,
the handle is manually adjustable by an associated operator to pivot the input shaft with respect to the first and second side plates to cause the second link to apply a force to the first link causing the first link to pivot with respect to the frame to cause the cable to adjust the blade between (1) the operational/lowered the position; and (2) the non-operational/raised position.

5. The non-powered lift mechanism of claim 1 wherein:
the input shaft comprises: (1) a first shaft member that is L-shaped having a main body and a leg; (2) a second shaft member that is L-shaped having a main body and a leg; (3) the leg of the first shaft member and the leg of the second shaft member are juxtaposed; (4) the main body of the first shaft member comprises the first end of the input shaft; and, (5) the main body of the second shaft member comprises the second end of the input shaft;
a first support tab is fixedly attached to the leg of the first shaft member;
a second support tab is fixedly attached to the leg of the second shaft member; and,
a pivot shaft is positioned within openings formed in the first and second tabs and within an opening in the second end of the second link to create the pivotal attachment of the second link to the input shaft.

6. The non-powered lift mechanism of claim 1 wherein:
the second link comprises first and second link members each having first and second ends;
the input shaft comprises an extension member having a first end fixedly attached to the input shaft and a second end pivotally attached to the second link;
a first pivot shaft is positioned within openings formed in the first ends of the first and second link members and an opening formed in the first link to create the pivotal attachment of the second link to the first link; and,
a second pivot shaft is positioned within openings formed in the second ends of the first and second link members and an opening formed in the second end of the extension member to create the pivotal attachment of the second link to the input shaft.

7. The non-powered lift mechanism of claim 4 further comprising:
a stop bar that is attached to the first and second side plates and that is contacted by one of the first link and the second link to limit the distance that the handle can move away from the operator when the handle is manually adjusted to cause the blade to adjust into the operational/lowered position.

8. The non-powered lift mechanism of claim 4 further comprising:
a roller that: (1) is supported to the end plate; (2) is rotatable about a rotation pin; and, (3) receives the cable to guide the cable to the blade; and,
first and second feet, each having a groove that receives a connector, that: (1) extend from the base plate; and, (2) attach the non-powered lift mechanism to the at least one of the front support rack and the back support rack.

9. A method comprising the steps of:
(A) providing an ATV having: (1) at least a first front wheel with a front wheel/tire height; (2) at least a first back wheel with a back wheel/tire height; (3) at least one of an engine and a motor that provides locomotion for the ATV; (4) a steering device having a contact surface used by an associated operator to steer the ATV; (5) at least one operator seat; and, (6) at least one of: (a) a front support rack that is positioned in front of the contact surface of the steering device and above the front wheel/tire height; and, (b) a back support rack that is positioned in back of the operator seat and above the back wheel/tire height;
(B) providing a snowplow assembly supported to the ATV and including a blade that: (1) has a plow surface that is suitable to contact and plow snow; and, (2) is adjustable between an operational/lowered position a non-operational/raised position;
(C) providing a non-powered lift mechanism comprising: (1) a frame; (2) an input shaft pivotally mounted to the frame; (3) a handle that is operatively attached to the input shaft and accessible to be adjusted by the operator while sitting on the vehicle operator seat; (4) a cable having a first end operatively connected to the input shaft and a second end; (5) a first link having a first end that is pivotally attached to the frame and a second end; (6) a second link having a first end that is pivotally attached to the first link and a second end that is pivotally attached to the input shaft, wherein the first end of the cable is attached to the second end of the first link;

(D) mounting the frame to one of the front support rack and the back support rack;

(E) attaching the second end of the cable to blade;

(F) manually adjusting the handle to pivot the input shaft to cause the cable to adjust the blade between at least one of: (1) the operational/lowered position; and, (2) the non-operational/raised position.

10. The method of claim 9 wherein:

step (C) comprises the step of: providing the input shaft with first and second ends that are accessible from first and second opposite sides of the non-powered lift mechanism; and, before step (F) the method comprises the step of: providing the options of: (1) attaching the handle to the first end of the input shaft to create a right handed operation application for the operator; and, (2) attaching the handle to the second end of the input shaft to create a left handed operation application for the operator.

11. The method of claim 9 wherein:

step (C) comprises the step of: providing the non-powered lift mechanism with: a stop bar that is attached to the frame; and, step (F) comprises the step of: contacting the stop bar with one of the first link and the second link to limit the distance that the handle can move away from the operator as the handle is manually adjusted to cause the blade to adjust into the operational/lowered position.

12. The method of claim 9 wherein:

step (C) comprises the step of: providing the non-powered lift mechanism with a locking mechanism comprising a push bar; and, before step (F) the method comprises the step of: sliding the push bar from a first position where the push bar physically interferes with the pivoting motion of the input shaft to a second position where the push bar does not physically interfere with the pivoting motion of the input shaft.

13. The method of claim 9 wherein:

Step (C) comprises the steps of (1) providing the frame with: (a) a base plate that is mountable to the vehicle; (b) first and second side plates that extend upward from opposite sides of the base plate; and, (c) an end plate that extends upward from the base plate and that has an opening; (2) extending the second end of the cable through the opening in the end plate; and, step (F) comprises the step of: causing the second link to apply a force to the first link causing the first link to pivot with respect to the fame.

14. A non-powered lift mechanism suitable to be used with an associated vehicle having a snowplow assembly supported to the vehicle and including a blade that: (a) has a plow surface that is suitable to contact and plow snow; and, (b) is adjustable between an operational/lowered position and a non-operational/raised position; wherein the non-powered lift mechanism comprises:

a frame that comprises: (1) a base plate that is mountable to the vehicle; (2) first and second side plates that extend upward from opposite sides of the base plate; and, (3) an end plate that extends upward from the base plate and that has an opening;

an input shaft having first and second ends that is pivotally mounted to the first and second side plates;

a handle that is operatively attached to the input shaft;

a first link having a first end that is pivotally attached to the frame and a second end;

a second link having a first end that is pivotally attached to the first link and a second end that is pivotally attached to the input shaft;

a cable that extends through the opening in the end plate and that has a first end attached to the second end of the first link and a second end attached to the blade; and, wherein the handle is manually adjustable by an associated operator to pivot the input shaft with respect to the first and second side plates to cause the second link to apply a force to the first link causing the first link to pivot with to frame to cause the cable to adjust the blade between (1) the operational/lowered position; and, (2) the non-operational/raised position.

15. The non-powered lift mechanism of claim 14 wherein:

the first end of the input shaft extends outside the first side plate;

the second end of the input shaft extends outside the second side plate;

the handle is mountable to the first end of the input shaft to create a right handed operation application for the operator; and, the handle is mountable to the second end of the input shaft to create a left handed operation application for the operator.

16. The non-powered lift mechanism of claim 14 further comprising:

a stop bar that is attached to the frame and that is positioned to limit the distance that the handle can move away from the operator when the handle is manually adjusted to cause the blade to adjust into the operational/lowered position.

17. The non-powered lift mechanism of claim 16 wherein:

the stop bar is attached to the first and second side plates; and, the stop bar is contacted by one of the first link and the second link to limit the distance that the handle can move away from the operator.

18. The non-powered lift mechanism of claim 14 wherein:

the input shaft comprises: (1) a first shaft member that is L-shaped having a main body and a leg; (2) a second shaft member that is L-shaped having a main body and a leg; (3) the leg of the first shaft member and the leg of the second shaft member are juxtaposed; (4) the main body of the first shaft member comprises the first end of the input shaft; and, (5) the main body of the second shaft member comprises the second end of the input shaft;

a first support tab is fixedly to the leg of the first shaft member;

a second support tab is fixedly attached to the leg of the second shaft member;

a pivot shaft is positioned within openings formed in the first and second tabs and within an opening in the second end of the second link to create the pivotal attachment of the second link to the input shaft.

19. The non-powered lift mechanism of claim 14 wherein:

the second link comprises first and second link members each having first and second ends;

the input shaft comprises an extension member having a first end fixedly attached to the input shaft and a second end pivotally attached to the second link;

a first pivot shaft is positioned within openings formed in the first ends of the first and second link members and an opening formed in the first link to create the pivotal attachment of the second link to the first link; and, a second pivot shaft is positioned within openings formed in the second ends of the first and second link members and an opening formed in the second end of the extension member to create the pivotal attachment of the second link to the input shaft.

20. The non-powered lift mechanism of claim 14 further comprising:

a locking mechanism that is manually adjustable between: (1) a first condition preventing the input shaft from pivoting; and, (2) a second condition permitting the input shaft to pivot;

wherein the locking mechanism comprises: (A) a push bar that is manually slideable between: (1) a first position where the push bar physically interferes with the pivoting motion of the input shaft; and, (2) a second position where the push bar does not physically interfere with the pivoting motion of the input shaft; and, (B) a motion limit device that: (1) limits the motion of the push bar into the non-powered lift mechanism; and (2) prevents the push bar from being removed from the non-powered lift mechanism.

\* \* \* \* \*